United States Patent
Waters et al.

(10) Patent No.: US 9,103,916 B2
(45) Date of Patent: Aug. 11, 2015

(54) APPARATUS AND METHOD FOR INDOOR POSITIONING

(75) Inventors: Deric W. Waters, Dallas, TX (US); Jayawardan Janardhanan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 508 days.

(21) Appl. No.: 13/462,386

(22) Filed: May 2, 2012

(65) Prior Publication Data

US 2013/0293416 A1 Nov. 7, 2013

(51) Int. Cl.
G01S 19/48 (2010.01)

(52) U.S. Cl.
CPC ..................... *G01S 19/48* (2013.01)

(58) Field of Classification Search
CPC .......... G01S 19/05; G01S 19/46; G01S 19/48
USPC ............... 342/357.25, 357.29, 357.31, 357.4; 701/468, 469
See application file for complete search history.

(56) References Cited

U.S. PATENT DOCUMENTS

| | | |
|---|---|---|
| 2008/0186234 A1 | 8/2008 | Alles et al. |
| 2009/0303120 A1 | 12/2009 | Alizadeh-Shabdiz |
| 2009/0322603 A1 | 12/2009 | Liao |
| 2011/0117924 A1 | 5/2011 | Brunner et al. |

FOREIGN PATENT DOCUMENTS

WO 2010059935 A1 5/2010

OTHER PUBLICATIONS

Roos et al., "A Probabilistic Approach to WLAN User Location Estimation," International Journal of Wireless Information Networks, vol. 9, No. 3, Jul. 2002 (10 pages).
Thiagarajan et al., "VTrack: Accurate, Energy-Aware Road Traffic Delay Estimation Using Mobile Phones," SenSys, Berkeley, California Nov. 4-6, 2009 (14 pages).

*Primary Examiner* — Dao Phan
(74) *Attorney, Agent, or Firm* — Steven A. Shaw; Frank D. Cimino

(57) ABSTRACT

Apparatus and method for positioning a wireless device. In one embodiment, a method for indoor positioning includes determining a reference location of a wireless device, based on satellite positioning, as the device passes between areas of satellite positioning signal reception and satellite positioning signal non-reception. While in the areas of non-reception, signals transmitted by wireless local area network (WLAN) access points (APs) and parameters of motion of the device are measured. Positions of the device are estimated while in the areas of non-reception based on the reference location and the parameters of motion. A positioning grid for positioning is generated based on the signals measured by the wireless device at the estimated positions.

12 Claims, 2 Drawing Sheets

APPARATUS AND METHOD FOR INDOOR POSITIONING

BACKGROUND

As mobile devices proliferate, the demand for services tailored to device location also increases. Location based services depend on positioning systems to determine device location. Satellite based positioning systems, such as the global positioning system (GPS), GLONASS, and Galileo can provide high accuracy, but require a clear line of sight between the satellites and the mobile device to provide a position determination. Consequently, satellite positioning systems are largely ineffective for indoor positioning. Satellite positioning also requires specialized receivers that may increase the cost of the mobile device.

As an alternative or an augmentation to satellite based positioning, wireless local area network (WLAN) based positioning systems have been developed. WLAN based positioning systems are suitable for indoor positioning and require minimal investment because they make use of existing infrastructure. Furthermore, many mobile wireless devices include support for communication via WLAN. Systems that provide improvements in indoor positioning are desirable.

SUMMARY

A system and method for indoor positioning based on wireless local area network fingerprinting are disclosed herein. In one embodiment a method for indoor positioning includes determining, by a wireless device, a reference location of the wireless device, based on satellite positioning, as the device passes between areas of satellite positioning signal reception and satellite positioning signal non-reception. While in the areas of non-reception, the wireless device measures signals transmitted by wireless local area network (WLAN) access points (APs). While in the areas of non-reception, the wireless device measures parameters of motion of the wireless device. Positions of the wireless device in the areas of non-reception are estimated based on the reference location and the parameters of motion. A positioning grid for positioning is generated based on the signals measured by the wireless device at the estimated positions.

In another embodiment, a wireless device includes a satellite positioning system, a WLAN transceiver, a motion measurement system, and a position estimation system. The satellite positioning system is configured to determine a location of the wireless device based on received satellite positioning signals. The WLAN transceiver is configured to measure while in the areas of non-reception, signals transmitted by WLAN APs. The motion measurement system is configured to measure movement of the wireless device. The position estimation system is configured to determine a reference location of the wireless device, based on satellite positioning, as the device passes between areas of satellite positioning signal reception and satellite positioning signal non-reception. The position estimation system is also configured to record measurements of movement of the wireless device and measurements of WLAN AP signals within areas of satellite positioning signal non-reception. The position estimation system is further configured to provide the reference location and the recorded measurements to a positioning database that generates a positioning grid for positioning based on the WLAN AP signals measured by the wireless device at the positions estimated from the measurements of movement.

In a further embodiment, a system for crowd-sourced fingerprinting includes a positioning database and a mobile wireless device. The positioning database is configured to store information relating WLAN AP signal measurements to points of a geographic positioning grid. The mobile wireless device includes a satellite positioning system, a WLAN transceiver, a motion measurement system, and position estimation logic. The position estimation logic is configured to determine a reference location of a wireless device, based on satellite positioning information provided by the satellite positioning system, as the device passes between areas of satellite positioning signal reception and satellite positioning signal non-reception. The position estimation logic is also configured to record measurements of movement of the wireless device provided by the motion measurement system and measurements of WLAN AP signals provided by the WLAN transceiver within areas of non-reception. The position estimation logic is further configured to provide the reference location and the recorded measurements to the positioning database.

In yet another embodiment, a positioning server includes a positioning database. The positioning database is configured to store information relating wireless local area network (WLAN) access point (AP) signal measurements to points of a geographic positioning grid; to store motion information provided by dead-reckoning systems of a plurality of wireless devices and reference location information provided by at least one of a satellite positioning system and a wireless local area network (WLAN) positioning system of each wireless device; and to store WLAN access point (AP) signal measurements acquired by each wireless device in correspondence with the motion information. The positioning database is also configured to non-causally determine positions of the wireless devices based on the motion information and reference locations; and to generate a geographic positioning grid that relates the AP signal measurements to points of the positioning grid based on the determined positions.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
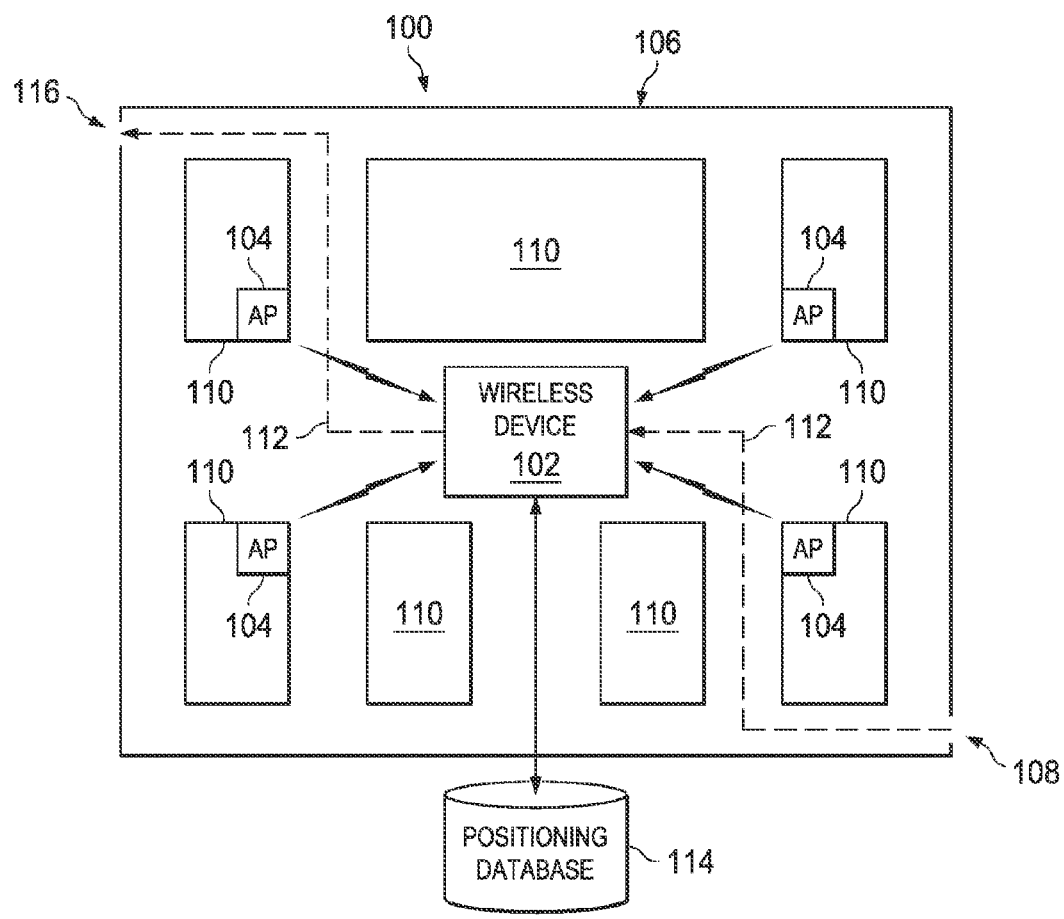
FIG. 1 shows a block diagram for a system for indoor positioning that includes crowd-sourced fingerprinting in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

One solution for indoor positioning involves wireless local area network (WLAN) fingerprinting. See, e.g., Teemu Roos et al., *A Probabilistic Approach* to WLAN User Location Estimation, INT'L J. OF WIRELESS INFO. NETWORKS, July 2002, at 155. In WLAN fingerprinting, a database includes location information associated with received signal strength measurement values from WLAN access points (APs) that were generated during a database creation phase. In one variant of WLAN fingerprinting, received signal strength measurement values at a given location are estimated based on a radio frequency (RF) propagation model, thus requiring no actual measurement of signal strengths. A higher-complexity variant of WLAN fingerprinting takes actual measurements of signal strength at all possible locations (e.g., all points of a positioning grid) within an area to be mapped. The performance of fingerprinting systems based on RF propagation models may be suboptimal, while the cost of the higher-complexity system may be prohibitive.

Embodiments of the present disclosure build a fingerprinting database from information actively or passively provided by a plurality of wireless devices as the wireless devices traverse the indoor space being mapped (i.e., fingerprinted). Each wireless device contributing to the fingerprint database provides dead-reckoning information and received signal strength information to the database. The database uses the information to map signal strength for each access point to geographic locations.

FIG. 1 shows a block diagram for a system for indoor positioning that includes crowd-sourced fingerprinting in accordance with various embodiments. The system 100 includes a plurality of APs 104, a wireless device 102, and a positioning database 114. Each of the APs 104 is configured to communicate with the wireless device 102 via a WLAN, e.g., a WLAN in accordance with an IEEE 802.11 standard. The APs 104 are disposed such the wireless device 102 can receive signals transmitted by the APs 104 as the wireless device 102 traverses the interior of the structure 106.

The wireless device 102 is configured to wirelessly communicate with one or more of the APs 104. In the embodiment of FIG. 1, the wireless device 102 is positioned to receive transmissions from and/or communicate with any of the APs 104. The wireless device 102 includes a satellite positioning system and a dead-reckoning system. The wireless device 102 may be a cellular telephone, a tablet computer, or any other mobile computing device configured for WLAN access, satellite positioning, and motion measurement. While only four APs and single mobile wireless device are shown in FIG. 1, in practice the system 100 may include any number of wireless devices 102 and APs 104.

The structure 106 may be a building or other area within which satellite positioning is unavailable or undesirable. The structure 106 includes pathways 112 over which the wireless device 102 may traverse the interior of the structure 106. In FIG. 1, the wireless device 102 enters the structure 106 at entry point 108, and traverses the interior of the structure 106 on pathways 112 to exit point 116. The regions 110 represent areas within the structure 106 that are not pathways 112 traversable by the wireless device 102.

While able to receive satellite signals (e.g., outside the structure 106), the wireless device 102 determines its location via satellite positioning. After entering the structure 106, satellite positioning may be unavailable or inaccurate. Therefore, the wireless device 102 applies dead-reckoning within the structure 106, based on a last determined satellite position, and provides motion and AP signal strength information to the positioning database 114 as the wireless device 102 traverses the interior of the structure 106.

The positioning database 114 stores motion and AP signal strength information provided by the wireless device 102 and a plurality of other wireless devices. Dead-reckoning may be accurate for a limited time after the wireless device 102 enters the structure 106. Consequently, the positioning database 114 may be initially populated only with regard to the area of the structure 106 near the entry point 108. Over time the positioning database 114 refines dead-reckoning positions and the AP signal strengths observed by devices at various points on the pathways 112, and provides the location and signal strength information to wireless devices traveling further into the structure 106 allowing all the pathways 112 to be mapped. As the fingerprinting information provided by the database 114 becomes more accurate, the wireless device 102 can determine its location in the structure via WLAN positioning and provide dead-reckoning positions and AP signal strengths from locations farther into the interior of the structure 106. In this manner, the entirety of the pathways 112 is eventually mapped. Thus, the positioning database 114 and the wireless device 102 cooperate to generate a crowd-sourced WLAN fingerprinting system for use in indoor positioning.

Figure 2:
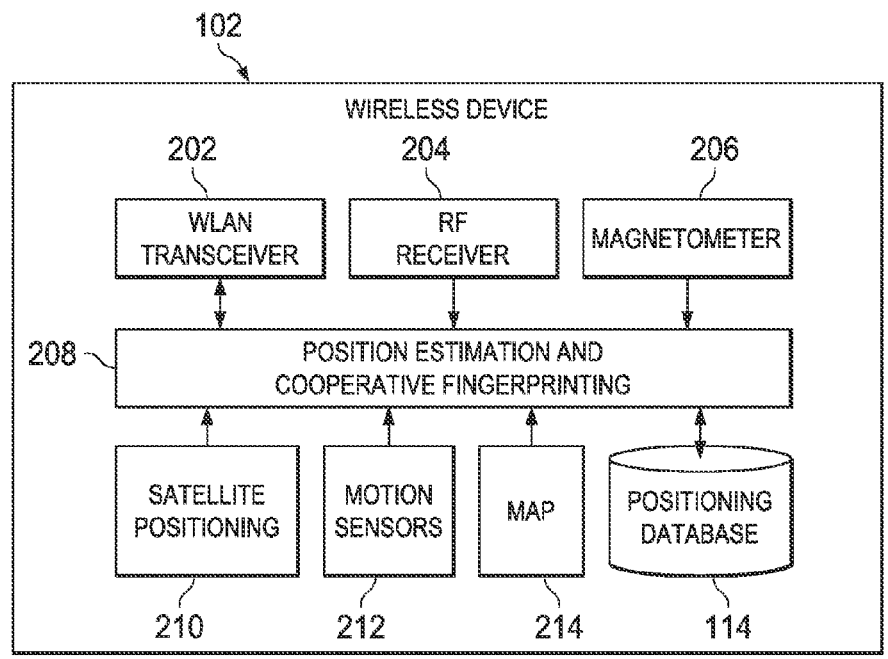
FIG. 2 shows a block diagram for a wireless device configured for indoor positioning using crowd-sourced fingerprinting in accordance with various embodiments.

FIG. 2 shows a block diagram of the wireless device 102. The wireless device 102 is configured for indoor positioning using crowd-sourced fingerprinting in accordance with various embodiments. The wireless device 102 includes a WLAN transceiver 202, a satellite positioning system 210, and motion sensors 212 each of which provide information to the position estimation and cooperative fingerprinting module 208 (position estimation module 208). The WLAN transceiver 202 provides an interface through which the wireless device 102 accesses the wireless medium to communicate with one or more of the APs 104. The WLAN transceiver 202 receives signals transmitted by the APs 104 and derives signal strength values, such as received signal strength indicator (RSSI) values, from the received signals.

The satellite positioning system 210 is configured to receive positioning signals transmitted by positioning satellites, and based on the time of flight of positioning signals received from a plurality of positioning satellites, determine the position of the wireless device 102. The satellite positioning system 210 can resolve the position of the wireless device 102 when provided with an unobstructed view of at least four of the positioning satellites. The satellite positioning system 102 may be a GPS receiver or any other system configured to determine the position of the wireless device 102 based on signals received from a satellite.

The motion sensors 212 measure parameters of displacement, movement, and/or location of the wireless device. The motion sensors 212 may include accelerometers, gyroscopes, magnetometers, barometers, etc. At least some such sensors may be implemented as MEMS (microelectromechanical systems) devices. Information provided by the sensors 212 may be used to extrapolate the location of the wireless device 102 based on a last known position obtained via satellite or WLAN positioning when the wireless device 102 is traversing the interior of the structure 106.

The position estimation module 208 collects the positioning information generated by the satellite positioning system 210, the motion sensors 212, and the WLAN transceiver 202 and, based on the collected information, may estimate the position of the wireless device 102. Thus, the position estimation module 210 may include a WLAN positioning system that determines the position of the wireless device 102 based on strength of received AP signals and fingerprint information provided by the database 114.

The position estimation module 208 also provides the collected positioning information (signal strengths, motion information, etc.) to the positioning database 114. In some embodiments of the wireless device 102, the positioning database 114 may be disposed within the wireless device 102. In some embodiments, the positioning database 114 may external to the wireless device 102 (e.g., on a server) and accessible to the wireless device 102 via one of the APs 104 or via a different communication network (e.g., a wireless wide area network).

To provide additional positioning information while traversing the interior of the structure 106, some embodiments of the wireless device 102 include one or more additional RF receiver 204, a magnetometer 206, and/or a map 214. The additional RF receivers 204 may be a wireless telephone receiver, a broadcast frequency modulated (FM) signal receiver, a personal area network (e.g., BLUETOOTH) receiver, a digital television (DTV) signal receiver, etc. The RF receiver 204 measures a parameter of the received RF signal (e.g., signal power) and provides the parameter measurements to the position estimation module 208.

The magnetometer 206 may provide a heading or travel direction, e.g., a direction relative to magnetic north, to the position estimation module 208. The magnetometer 206 may also provide measurements of magnetic field strength proximate to the wireless device 102 to the position estimation module 208. The measurements of magnetic field strength may be used by the database 114 to build a map of magnetic fields within the structure 106, and to position the wireless device 102 based on measured strength of the magnetic fields in conjunction with measured AP/RF signal strength. Functions of the magnetic field strength data, such as the norm of the magnetic field, may also be used to construct a fingerprint of the magnetic fields of the structure 106.

The map 214 provides information defining the pathways 112 of the structure 106. Some embodiments of the position estimation module 208 apply the map data to improve a position determined based on the motion sensors 212. For example, if dead-reckoning places the wireless device 102 in a region 110 of the structure 106 (i.e., not on a pathway 112) as defined in the map 214, then the position estimation module 208 may deem the position of the wireless device 102 to be the nearest position within a pathway 112. In some embodiments, the map 214 is stored external to the wireless device 102. The positioning database 114 may use the map 214 non-causally to resolve the location of the wireless device 102. For example, the positioning database 114 may apply the map 214 to refine past locations of the wireless device 102. Given an accurate map, map matching can be extremely effective. In many buildings, there are a limited number of possible routes. Even with relatively inaccurate dead-reckoning, the correct route can be estimated using measurements from the entire route. Embodiments may apply any of various map matching algorithms known in the art. For example, some embodiments may implement map matching using a Viterbi algorithm. See, e.g., Arvind Thiagarajan et al., *VTrack: Accurate, Energy-aware Road Traffic Delay Estimation Using Mobile Phones* (2009).

The position estimation module 208 collects the various signal measurements (AP received signal strength, RF power, magnetic field, etc.) along with measurement time information, such as time-stamps, and signal source information, such as AP media access controller addresses, sometimes referred to as BSSID (Basic Service Set Identifier). The collected information may be provided to the database 114 at or near the time of collection, or stored for provision to the database 114 at a later time, for example, at a preset interval or when a predetermined quantity of data is collected or when the device has free access to the internet (not roaming). Similarly, the position estimation module 208 collects motion information (e.g., speed, acceleration, heading, etc.) from the motion sensors 212 and provides the information along with time of acquisition to the database 114. The sampling of motion information may be uniform (e.g., once per second), or non-uniform (e.g., per user step).

The motion sensors 212 and the position estimation module 208 may comprise an inertial navigation system or may apply pedestrian dead-reckoning techniques as appropriate (e.g., vehicular versus pedestrian applications). Speed and heading may be provided to the database 114 as velocities in east, north, and up coordinates, and horizontal and vertical speeds and/or displacements may be separately provided.

In some embodiments, the position estimation module 208 may estimate the position of the wireless device 102 based on the motion information and provide the estimated position to the database 114. In other embodiments, the database 114 performs the position estimation. Thus, the wireless device 102 can operate as measuring device and provide measurements to the positioning database 114. Different embodiments of the position estimation module 208 may provide different levels of processing. For example embodiments may trade-off the amount of data uploaded and the amount of computations/memory required at the wireless device 102.

In some embodiments of the wireless device 102, the position estimation module 208 sets a heading for dead-reckoning based on satellite positioning prior to entry of the structure 106. Given an initial heading based on satellite positioning, the position estimation module 208 may compute the motion parameters (device displacement) without computing an absolute heading. Such heading initialization is advantageous because the magnetometer 206 is not required, although the magnetometer 206 may also be used to establish a heading in some embodiments. The initial heading computed based on satellite positioning may be the bearing angle between two different position estimates (which are computed using pseudorange measurements), or the satellite signals also allow heading to be computed directly through Doppler frequency measurements. In practice, both pseudorange and Doppler frequency measurements may be used to compute this initial heading.

In embodiments that establish an initial heading based on satellite positioning, dead-reckoning can be performed based on an accelerometer and a gyroscope, where the gyroscope provides heading change information. Gyroscope data may be provided with or without bias removal along with bias, where bias removal reduces the number of bits transferred or the number of server computations. The satellite determined heading can be used to calibrate the magnetometer 206. The magnetometer 206 also provides heading information in environments that are relatively free of magnetic noise. For information regarding calibration of the magnetometer 206 based on the satellite determined heading, see U.S. Provisional Patent Application 61/522,112, filed Aug. 10, 2011, which is hereby incorporated herein by reference in its entirety.

The position estimation module 208 can determine the location of the wireless device 102 based on satellite position when the wireless device 102 exits the structure 106 at point 116. Based on the current satellite determined location, the position estimation module 208 can estimate, from stored motion information, the position of the wireless device 102 at different points as it approached the exit point 116. Such estimation is non-causal because current measurements are used to determine previous locations.

Thus, the position estimation module 208 can estimate the position of the wireless device 102 within the structure 106 at a given time based on satellite positions determined at both entry point 108 and exit point 116, effectively doubling the number of measurements provided to the positioning database 114. The heading of the wireless device 102 on exit may also be determined based on satellite positioning, and used to improve estimates of the position of the wireless device 102 as it approached the exit point 116. As previously explained, the database 114 may be configured to determine the location of the wireless device 114 based on satellite position, motion information, etc. provided by the position estimation module.

Various components of the mobile wireless device 102 and the positioning database 114 including at least some portions of the position estimation module 208 can be implemented using a processor executing software programming that causes the processor to perform the operations described herein. In some embodiments, a processor executing software instructions causes the wireless device 102 to collect motion information and signal strength information, and provide the information to the positioning database. Further, a processor executing software instructions can aggregate motion and signal strength information from a plurality of wireless devices and generate, based on the information, a fingerprint for the interior pathways 112 of the structure 106.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming (i.e., processor executable instructions) that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, read-only-memory), or combinations thereof. Processors execute software instructions. Software instructions alone are incapable of performing a function. Therefore, in the present disclosure any reference to a function performed by software instructions, or to software instructions performing a function is simply a shorthand means for stating that the function is performed by a processor executing the instructions.

In some embodiments, portions of the mobile wireless device 102, including portions of the position estimation module 208 may be implemented using dedicated circuitry (e.g., dedicated circuitry implemented in an integrated circuit). Some embodiments may use a combination of dedicated circuitry and a processor executing suitable software. For example, some portions of the position estimation module 208 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 3:
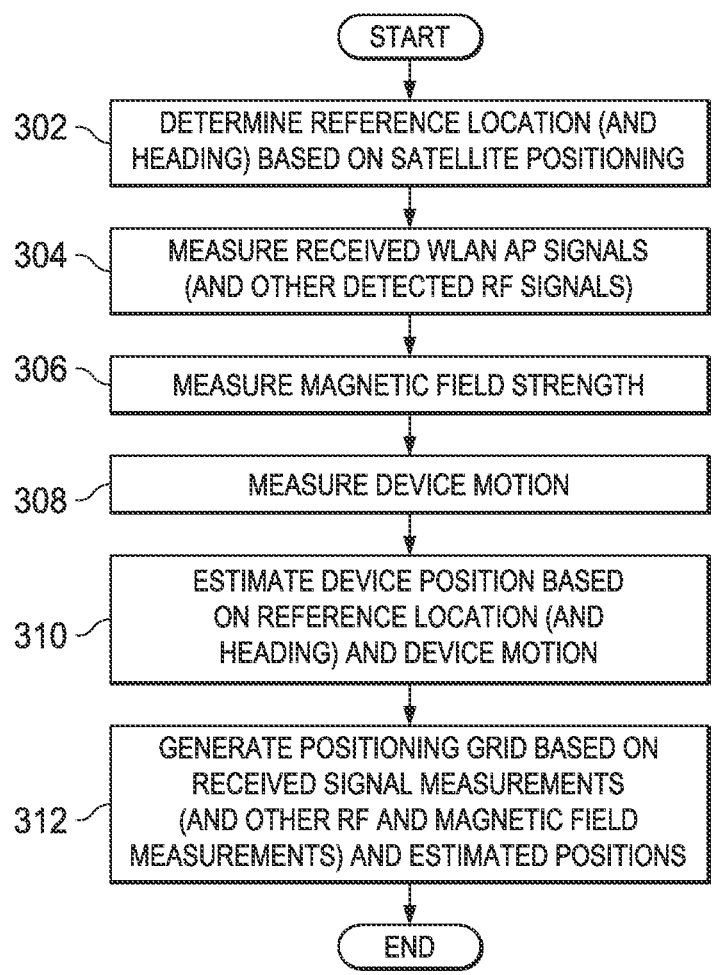
FIG. 3 shows a flow diagram for a method for indoor positioning using crowd-sourced fingerprinting in accordance with various embodiments.

FIG. 3 shows a flow diagram for a method 300 for indoor positioning using crowd-sourced fingerprinting in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 300, as well as other operations described herein, can be performed by a processor executing instructions stored in a computer readable medium.

In block 302 the wireless device 102 is passing from an area of satellite signal reception to an area of satellite signal non-reception. For example, the wireless device 102 is entering the structure 106. While receiving satellite positioning signals, the wireless device 102 determines its position and heading via satellite positioning. The wireless device 102 initializes a dead-reckoning system of the wireless device 102 based on the satellite derived position and heading. The dead-reckoning system provides motion and/or position information to the wireless device 102 while operating in the area of satellite signal non-reception (e.g., within the structure 106).

In block 304, the wireless device 102 measures signals transmitted by the APs 104. The wireless device 102 may measure the received signal strength (e.g., RSSI) of signals transmitted by the APs 104. The wireless device 102 may also measure a parameter (e.g., received signal power) of other RF signals. For example, the wireless device 102 may measure personal area network (e.g., BLUETOOTH) signals, FM broadcast signals, DTV broadcast signals, mobile telephone signals, etc. The wireless device 102 may store the measured signal parameters along with a value indicating time of measurement (e.g., a time stamp) and provide the measured parameters and associated time stamps to the database 114 for use in constructing a fingerprint of the structure 106.

In block 306, the wireless device 102 measures magnetic field strength in the vicinity of the wireless device 102. Like the RF signal measurements, the magnetic field strength measurements are time-stamped and provided to the database 114 for use in constructing a fingerprint of the structure 106.

In block 308, the wireless device 102 measures one or mores parameters of motion or location that can be used to position the device in lieu of satellite positioning. For example, the wireless device 102 may measure heading, speed, acceleration, altitude, etc. In some embodiments, the motion/location measurements are time-stamped and provided to the database 114 for use in constructing a fingerprint of the structure 106.

In block 310, the wireless device 102 or the database 114 processes the motion/location measurements to estimate device location within the structure 106 at the time of measurement acquisition. Thus, in some embodiments, the wireless device 102 provides position estimates to the database 114. A position estimate may be with reference to satellite position determined at entry point 108 or exit point 116, or with reference to WLAN positioning based on AP signal strengths and the WLAN fingerprint of the structure 106 developed over time by the database 114. Thus, for at least some motion/location information acquired by the wireless device 102, two position estimates may be derived—a first estimate referenced to entry point 108 and a second estimate reference to exit point 116. In some embodiments, position estimates may determined based on a map of the internal pathways 112 of the structure 106.

In block 312, the database 114 aggregates the signal strength information and motion/location information provided by the wireless device 102 with signal strength information and motion/location information provided by other wireless devices traversing the pathways 112 of the structure 106. Based on this information, the database 114 constructs a fingerprint of the structure 106 that relates position within the structure 106 to parameters (e.g., signal strength) of signals (e.g., AP transmissions) observed by devices at the position. The fingerprint may be in the form of grid. The database 114 develops the fingerprint over time as additional data from wireless devices is acquired. In some embodiments, construction of the fingerprint begins at the entry and exit points 116 (based on satellite positioning) and extends inward through the structure 106 as WLAN and/or other RF or magnetic field position becomes accurate enough to extend the reach of dead-reckoning.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for indoor positioning, comprising:
    determining, by a wireless device, a reference location of the wireless device, based on satellite positioning, as the device passes between areas of satellite positioning signal reception and satellite positioning signal non-reception;
    measuring, by the wireless device, while in the areas of non-reception, signals transmitted by wireless local area network (WLAN) access points (APs);
    measuring, by the wireless device, while in the areas of non-reception, parameters of motion of the wireless device;
    estimating positions of the wireless device in the areas of non-reception based on the reference location and the parameters of motion by determining a position of the wireless device in the areas of non-reception based on a reference location established via satellite positioning determined subsequent to the measuring of the parameters of motion; and
    generating a positioning grid for positioning based on the signals measured by the wireless device at the estimated positions.

2. The method of claim 1, further comprising determining, based on satellite positioning, a reference location as the wireless device enters or exits the areas of signal non-reception.

3. The method of claim 1, further comprising:
    determining a heading, based on satellite positioning, as the wireless device enters or exits areas of non-reception; and
    initializing a motion parameter measurement system of the wireless device based on the determined heading.

4. The method of claim 1, wherein the estimating comprises determining a position of the wireless device based on a map of areas of non-reception in conjunction with the parameters of motion and reference location; and wherein the parameters of motion comprise one or more of direction, velocity, acceleration, and altitude.

5. The method of claim 1, further comprising:
    measuring, by the wireless device, while in the areas of non-reception, at least one additional signal selected from: personal area network signals, broadcast frequency modulated signals, wireless telephony signals, broadcast digital television signals, and magnetic field strength;
    wherein the generating comprises generating the positioning grid for positioning based on the additional signals measured by the wireless device at the estimated positions.

6. The method of claim 1, wherein generating the positioning grid comprises refining the positioning grid by combining measurements of signals transmitted by the WLAN APs received by a plurality of wireless devices and estimated positions, based on parameters of motion, of the plurality of wireless devices.

7. A method for indoor positioning, comprising:
    determining, by a wireless device, a reference location of the wireless device, based on satellite positioning, as the device passes between areas of satellite positioning signal reception and satellite positioning signal non-reception;
    measuring, by the wireless device, while in the areas of non-reception, signals transmitted by wireless local area network (WLAN) access points (APs);
    measuring, by the wireless device, while in the areas of non-reception, parameters of motion of the wireless device;
    estimating positions of the wireless device in the areas of non-reception based on the reference location and the parameters of motion by determining a position of the wireless device in the areas of non-reception based on both a satellite positioning derived reference location determined prior to the measuring of the parameters of motion and a satellite positioning derived reference location determined subsequent to the measuring of the parameters of motion; and
    generating a positioning grid for positioning based on the signals measured by the wireless device at the estimated positions.

8. The method of claim 7, further comprising determining, based on satellite positioning, a reference location as the wireless device enters or exits the areas of signal non-reception.

9. The method of claim 7, further comprising:
    determining a heading, based on satellite positioning, as the wireless device enters or exits areas of non-reception; and
    initializing a motion parameter measurement system of the wireless device based on the determined heading.

10. The method of claim 7, wherein the estimating comprises determining a position of the wireless device based on a map of areas of non-reception in conjunction with the parameters of motion and reference location; and wherein the parameters of motion comprise one or more of direction, velocity, acceleration, and altitude.

11. The method of claim 7, further comprising:
    measuring, by the wireless device, while in the areas of non-reception, at least one additional signal selected from: personal area network signals, broadcast frequency modulated signals, wireless telephony signals, broadcast digital television signals, and magnetic field strength;

wherein the generating comprises generating the positioning grid for positioning based on the additional signals measured by the wireless device at the estimated positions.

12. The method of claim 7, wherein generating the positioning grid comprises refining the positioning grid by combining measurements of signals transmitted by the WLAN APs received by a plurality of wireless devices and estimated positions, based on parameters of motion, of the plurality of wireless devices.

* * * * *